United States Patent
Prukop

(10) Patent No.: US 7,021,378 B2
(45) Date of Patent: Apr. 4, 2006

(54) METHOD FOR ENHANCING THE RETENTION EFFICIENCY OF TREATMENT CHEMICALS IN SUBTERRANEAN FORMATIONS

(75) Inventor: Gabriel Prukop, Katy, TX (US)

(73) Assignee: Chevron U.S.A., San Ramon, CA (US)

( * ) Notice: Subject to any disclaimer, the term of this patent is extended or adjusted under 35 U.S.C. 154(b) by 105 days.

(21) Appl. No.: 10/751,161

(22) Filed: Dec. 31, 2003

(65) Prior Publication Data
US 2005/0139356 A1 Jun. 30, 2005

(51) Int. Cl.
E21B 43/12 (2006.01)
E21B 43/22 (2006.01)

(52) U.S. Cl. .................. 166/279; 166/280.1; 166/300; 166/305.1; 507/224; 507/237; 507/239; 507/277; 507/902; 507/904

(58) Field of Classification Search ............... 166/279, 166/280.1, 280.2, 300, 305.1, 310, 902; 507/224, 507/237, 239, 269, 277, 902, 904, 921, 939
See application file for complete search history.

(56) References Cited

U.S. PATENT DOCUMENTS

| | | | | |
|---|---|---|---|---|
| 3,247,902 A | * | 4/1966 | Poollen | 166/279 |
| 3,704,750 A | * | 12/1972 | Miles et al. | 166/279 |
| 3,724,551 A | * | 4/1973 | Troscinski et al. | 166/295 |
| 4,357,248 A | * | 11/1982 | Berkshire et al. | 507/236 |
| 4,602,683 A | * | 7/1986 | Meyers | 166/279 |
| 4,860,829 A | | 8/1989 | Carlberg et al. | |
| 4,947,934 A | * | 8/1990 | Hen | 166/279 |
| 5,002,126 A | | 3/1991 | Carlberg et al. | |
| 5,027,901 A | * | 7/1991 | French et al. | 166/310 |
| 5,060,728 A | * | 10/1991 | Yan | 166/279 |
| 5,139,088 A | | 8/1992 | De Boer et al. | |
| 5,141,655 A | * | 8/1992 | Hen | 507/224 |
| 5,186,257 A | | 2/1993 | Stahl et al. | |
| 5,196,124 A | * | 3/1993 | Connor et al. | 166/279 |
| 5,211,237 A | * | 5/1993 | Faircloth et al. | 166/279 |
| 5,690,174 A | * | 11/1997 | Chapman et al. | 166/275 |
| 5,762,138 A | | 6/1998 | Ford et al. | |
| 5,964,291 A | * | 10/1999 | Bourne et al. | 166/279 |
| 6,148,913 A | | 11/2000 | Collins | |
| 6,464,009 B1 | * | 10/2002 | Bland et al. | 166/300 |
| 6,581,687 B1 | | 6/2003 | Collins et al. | |
| 2003/0155123 A1 | | 8/2003 | Wat et al. | |
| 2005/0115710 A1 | * | 6/2005 | Kotlar et al. | 166/295 |

FOREIGN PATENT DOCUMENTS

EP 0 479 462 A1 9/1991

OTHER PUBLICATIONS

Lawless, T.A. and Smith, R.N., New Technology, Invert Emulsion Scale Inhibitor Squeeze Design, *Society of Petroleum Engineers (SPE 50705)*, 1-9, 1998.

Wat, R., Montgomerie, H., Hagen, T., Boreng, R., Kotlar, H.K., and Vikane, O., Development of an Oil-Soluble Scale Inhibitor for a Subsea Satellite Field, *Society of Petroleum Engineers (SPE 50706)*, 1-8, 1999.

Boreng, R., Bakken K.O., and Vikane, O., A Stimulation Treatment of a Sub Sea Well Using a Scale Dissolver, *Society of Petroleum Engineers (SPE 50736)*, 353-359, 1999.

* cited by examiner

Primary Examiner—George Suchfield
(74) Attorney, Agent, or Firm—Richard J. Schulte

(57) ABSTRACT

A method for retaining a treatment chemical in a subterranean formation containing hydrocarbons is disclosed. The method includes first preparing an emulsion. The emulsion contains an oil continuous phase and first and second aqueous phases. The first aqueous phase includes a treatment chemical, such as a scale inhibitor. The second aqueous phase comprises a retention enhancing chemical which is to be reacted with the treatment chemical in the subterranean formation. Preferably, the first and second aqueous phases remain generally separately dispersed and stable within the oil continuous phase prior to being introduced into the subterranean formation. The emulsion is then placed down a well bore and into the subterranean formation. The first and second aqueous phases then interact with one another in the subterranean formation such that the treatment chemical and the retention enhancing chemical react with one another resulting in the treatment chemical being retained in the subterranean formation at a greater efficiency than had the second aqueous phase, including the retention enhancing chemical, not been used.

24 Claims, No Drawings

METHOD FOR ENHANCING THE RETENTION EFFICIENCY OF TREATMENT CHEMICALS IN SUBTERRANEAN FORMATIONS

TECHNICAL FIELD

The present invention relates generally to the treatment of hydrocarbon bearing subterranean formations with chemicals, and more particularly, to those methods which enhance the retention of the treatment chemicals, such as scale inhibitors, in the formations.

BACKGROUND OF THE INVENTION

Treatment chemicals are often injected into subterranean formations containing hydrocarbons to aid in the production of the hydrocarbons. Examples of such treatment chemicals include scale inhibitors, corrosion inhibitors, asphaltene inhibitors, gas hydrate formation inhibitors, and wax deposition inhibitors. Ideally, these treatment chemicals will be retained by the subterranean formation with the treatment chemicals slowly being released from the formation and into the production fluids to provide treatment over an extended period of time. The slow release of the treatment chemicals can provide beneficial effects to the subsurface formation and fluid flow therein, to the well bore and to other downstream flow lines and fluid flow.

As a particular example, scale may cause restriction in flow due to scale deposition in the formation near the well bore, perforations, well bore, flow lines and facilities in hydrocarbon producing systems causing a reduction in the rate of oil and/or gas production. A common method to address scaling problems is to subject the production well to a "squeeze" treatment whereby an aqueous composition comprising scale inhibitors, such as phosphate esters and phosphonates, are introduced into the well, usually under pressure, and "squeezed" or forced into the formation and held there by physical or chemical means. The "squeeze" treatment often needs to be done one or more times a year and constitutes "down time" when no production takes place. Over the year there is a reduction in total production corresponding to the number of down times during the squeeze operations, as well as reduced production as the scaling problem builds up. The net result is frequent well interventions which impact well productivity and field profitability.

Conventionally, a rule of thirds is used when calculating a squeeze operation for scale inhibitors. Generally, a third of the inhibitor will immediately return when the well is put back on production, a third will be ineffective, and a third will be retained in the formation rock and will be slowly released during the life of the squeeze. Accordingly, a great amount of the scale inhibitor is ineffective, increasing the overall cost of the chemicals needed to do the treatment job. Further, because of the low retention efficiency, the time between treatment jobs is unduly short as well.

Calcium ions are often involved in the precipitation or adsorption of phosphonates. It currently believed that the phosphonates react with calcium ions to form a condensed phase that separates from a carrier fluid by adsorption or precipitation and is retained in the formation. A serious problem is getting the calcium and scale inhibitor to interact in the right location. If the scale inhibitor and calcium ions are mixed at a well surface, then precipitation may occur prematurely in the well bore. If the scale inhibitor is injected into the formation and followed by a calcium rich slug of fluid, the mixing in the formation can be very inefficient. The calcium slug tends to displace the inhibitor with little intermixing. Acidic inhibitors can often generate calcium ions by dissolving minerals like calcite that are already in the formation. However, this is not always as controlled as desired and in formations where there is little to no calcite, this is not a good option.

Use of water continuous phases as a carrier for treatment chemicals has shortcomings. Addition of significant amounts of water into a well can, at least temporarily, decrease the permeability of the formation to oil flow. The addition of water may cause clays to swell, again reducing the flow capability of hydrocarbons through a formation. Further, as water is significantly denser than a like volume of oil, low pressure reservoirs may require additional lift support to produce fluids from the hydrocarbon bearing formations.

Use of a generally oil continuous phase as a carrier for treatment chemicals overcomes some problems associated with using water continuous phases. The preparation of water in oil microemulsions to deploy scale inhibitors is described in U.S. Pat. No. 6,581,687 to Collins et al. The disclosure in this patent is hereby incorporated by reference in its entirety. A microemulsion is formed by dispersing an aqueous phase containing a scale inhibitor in an oil phase. The microemulsion is then placed down a production well and into a formation. The formation is then squeezed.

However, like the use of water continuous phases for delivering treatment chemicals to subterranean formations, the method of Collins et al. results in a substantial portion of the introduced treatment chemicals being flushed back with production fluids rather than being retained by rocks of the formation for a slow release over an extended period of time. More efficient retention of the treatment chemicals would extend the life time between squeezes.

The present invention addresses the aforementioned shortcomings in prior methods of chemically treating subterranean formations.

SUMMARY OF THE INVENTION

A method for retaining a treatment chemical in a subterranean formation containing hydrocarbons is disclosed. The method includes first preparing an emulsion or microemulsion. The emulsion contains an oil continuous phase and first and second aqueous phases. The oil continuous phase preferably includes at least one surfactant which aids in the formation of the oil continuous emulsion. The first aqueous phase includes a treatment chemical. The second aqueous phase comprises a retention enhancing chemical which is to be reacted with the treatment chemical in the subterranean formation. Preferably, the first and second aqueous phases remain generally separately dispersed and stable within the oil continuous phase prior to being introduced into the subterranean formation.

The emulsion is then placed down a well bore and into the subterranean formation. The first and second aqueous phases then interact with one another in the subterranean formation such that the first treatment chemical and the retention enhancing chemical react with one another resulting in the treatment chemical being retained in the subterranean formation at a greater efficiency than had the second aqueous phase, including the retention enhancing chemical, not been used.

The oil continuous phase and the first and second aqueous phases may invert or break into a water continuous phase or even into separate oil and aqueous phases within the subterranean formation to enhance the rate of reaction between the treatment chemical and the retention enhancing chemical. The inversion, breaking or separation of the emulsion may be enhanced due to a number of factors. First, the subterranean formation may include sufficient water to assist in the inversion of the emulsion from an oil continuous phase to a water continuous phase. Also, the emulsion may receive heat from the formation which can enhance the inversion process. Salt present in the formation and/or chemicals pre-existing in the formation which can change the pH of the emulsion components may aid in increasing the reaction rate between the treatment chemical and retention enhancing chemical.

Preferably, the first aqueous phase and the second aqueous phase are prepared as separate oil continuous emulsions prior to their being mixed together to form the oil continuous emulsion which is placed down the well bore and into the subterranean formation. Examples of treatment chemicals include scale inhibitors, corrosion inhibitors, asphaltene inhibitors, gas hydrate inhibitors, wax deposition inhibitors, proppants, and polymer and conformance controllers. Examples of retention enhancing chemicals include Group II metals, Group III metals, transition elements or organic molecules in an amount sufficient to react with the treatment chemical.

An object of the present invention is to provide a method in which the retention percentage of a treatment chemical introduced into a subterranean formation is enhanced over conventional deployment methods. Because of the increased retention efficiency of the treatment chemical, less of the treatment chemical may be required to complete a treatment job and/or else the overall time between treatments may be extended.

It is another object to introduce an emulsion into a subterranean formation which contains an oil continuous phase with a first aqueous phase including a treatment chemical and a second aqueous phase including a retention enhancing chemical which reacts with treatment chemical in the subterranean formation to increase the retention efficiency of the treatment chemical.

Yet another object is to use conditions existing in a subterranean formation, such as the presence of water, heat, minerals and salinity, to assist in the inversion of an emulsion from an oil continuous phase to a water continuous phase wherein a treatment chemical and retention enhancing chemical are allowed to react to increase the amount of the treatment chemical which will be retained by rocks of the formation.

BEST MODE(S) FOR CARRYING OUT THE INVENTION

A method for retaining a treatment chemical in a subterranean formation containing hydrocarbons is disclosed. The method includes first preparing an emulsion or microemulsion. For the purposes of this invention, either an emulsion or microemulsion may be used. The term "emulsion" shall hereinafter refer to both emulsions and microemulsions. The emulsion contains an oil continuous phase and first and second aqueous phases. The first aqueous phase includes a treatment chemical. The second aqueous phase comprises a retention enhancing chemical which is to be reacted with the treatment chemical in the subterranean formation. Preferably, the first and second aqueous phases remain generally separately dispersed and stable within the oil continuous phase prior to being introduced into the subterranean formation. Of course, it will be appreciated that a certain limited amount of mixing and reacting of the aqueous phase will occur during the creation of the emulsion.

The emulsion is then placed down a well bore and into the subterranean formation where the emulsion will break or invert. The first and second aqueous phases then interact with one another in the subterranean formation such that the first treatment chemical and the retention enhancing chemical react with one another resulting in the treatment chemical being retained in the subterranean formation at a greater efficiency than had the second aqueous phase, including the retention enhancing chemical, not been used.

Oil external emulsions or microemulsions can be made with a chemical rich aqueous phase. In the present invention, two emulsions may be used. In the first emulsion, a scale inhibitor would be dissolved in the internal water phase. In the second phase, the internal water phase would be rich in calcium or other precipitating ion. Prior to injecting into the well, the two emulsions would be mixed. Since the internal phase droplets are stable and completely surrounded by the oil phase, the two internal phases would not contact and thus not be able to interact. The emulsions are stabilized with a non-ionic surfactant or some combination of surfactants that have a non-ionic component. Non-ionic surfactants exhibit cloud points or phase inversion temperatures. This phase inversion temperature is a temperature at which the non-ionic surfactant becomes more hydrophobic. This temperature change upsets the hydrophile-lypophile balance and the emulsion will break or invert, so that the aqueous phase becomes the external or continuous phase. Since the inhibitor and calcium are both in the aqueous phases, they can now interact and precipitate.

In practice, the well bore and near formation is cooled and prepared by a preflush, then the mixed emulsion is injected. The well is shut in for 8–24 hours, while heat from the reservoir matrix warms the emulsion and inverts it. Alternatively, the inhibitor microemulsion can be displace by a hot post flush. This will quickly reheat the near well bore and force precipitation. Selection of chemical systems that will trigger an inversion at specified temperatures is well known to those versed in the art of scale treatment with scale inhibitors. Phase inversion temperatures can be defined relatively precisely. Alternately, ionic surfactants typically become more hydrophilic with temperature increases and can also be used.

I. Preparation of the Emulsion

The emulsion is ideally prepared by blending together a first base oil continuous emulsion containing the first aqueous phase including the treatment chemical and a second base oil continuous emulsion containing a second aqueous phase having the retention enhancing chemical. Alternatively, although not as preferred, the first and second aqueous phases can be directly mixed with an oil phase. The aqueous phases are ideally in the form of small droplets interspersed throughout the continuous oil phases. Emulsions containing the first and second aqueous phases are formulated to allow the aqueous phases of each emulsions to remain separate and stable when blended together yielding the overall emulsion. The emulsion will remain generally stable until being introduced into the subterranean formation wherein the first and second aqueous phases combine.

A. First Base Emulsion Including Treatment Chemical

The first base emulsion includes an oil base with surfactants. An aqueous phase containing the treatment chemical, such as a scale inhibitor, is prepared and mixed into the oil base and surfactants.

Oil Phase

The oil phase can be almost any liquid which is immiscible with the aqueous phase. For example the oil phase may be a paraffin oil, a natural oil, diesel, kerosene, gas oil, crude oil, base oil, may be selected from the group consisting of liquid alkanes (preferably $C_5$–$C_{20}$ alkanes, more preferably $C_8$ to $C_{15}$ alkanes, most preferably $C_9$–$C_{12}$ alkanes, for example, n-nonane, n-decane, and n-undecane), and liquid aromatic hydrocarbons (for example, toluene and xylene). The most preferred oil to be used for the oil phase is diesel.

Surfactant

A surfactant is ideally mixed in with the oil prior to the aqueous phase being added. The surfactant helps in the formation of the oil external emulsion. Suitably, the surfactant(s) may be an anionic surfactant or a non-ionic surfactant, i.e. a surfactant having anionic and non-ionic head groups respectively. Examples of anionic head groups include sulfosuccinate, sulfate, phosphate, carboxylate, sulfonate, and other water-soluble groups. Suitable counterions to the anionic head groups include sodium, potassium and ammonium cations. Suitable non-ionic head groups include alkoxylate groups. Typically, the surfactant(s) may have one or more hydrocarbon tail groups, for example 1 to 3 hydrocarbon tail groups. The hydrocarbon tail group(s) may be a halogenated hydrocarbon group such as a fluorinated hydrocarbon group. Generally, the hydrocarbon tail group is an alkyl group having a chain length of at least 5 carbon atoms, preferably at least 8 carbon atoms. Preferably, the hydrocarbon tail group is an alkyl group having a chain length of from 6 to 18 carbon atoms, more preferably 10 to 16 carbon atoms, most preferably 12 to 16 carbon atoms, for example, 12 carbon atoms.

The surfactant is suitably present in the first base emulsion in an amount ranging from 0.5 to 20% by weight, more preferably from 1 to 15% by weight, and more preferably from 2 to 10% by weight.

First Aqueous Phase Including Treatment Chemical

The first aqueous phase may contain a number of components including water, the treatment chemicals, and a solvent. In the preferred example, the treatment chemical is a scale inhibitor such as an organic phosphonate. Other treatment chemicals, by way of example, and not limitation, include corrosion inhibitors, asphaltene inhibitors, gas hydrate inhibitors, wax deposition inhibitors, proppants, and polymer and conformance controllers. Those skilled in the art will appreciate that other treatment chemicals may also be used in conjunction with other reactive chemicals which generally benefit from remaining separated until being placed into a subterranean formation.

The volume fraction of the aqueous phase in the emulsion may be as high as 80%. In the first emulsion containing the scale inhibitor, the aqueous phase may range from 1–80%, preferably 10 to 50%, more preferably 30 to 45%.

Aqueous Phase

The aqueous phase in the emulsion may comprise fresh water, sea water, produced or formation water. The aqueous phase may have a total salinity of 0–250 g/l, for example 5–50 g/l. The aqueous phase may have a pH of 0.5–9. Where the aqueous phase comprises a sea-water solution of a highly acidic production chemical such as, for example, a scale inhibitor, the aqueous phase may have a highly acidic pH, such as 0.1–5.

Scale Inhibitor

An oil field or gas field production scale inhibitor is effective in stopping calcium and/or barium scale or other scales. The scale inhibitors may be a water-soluble organic molecule with at least 2 carboxylic and/or phosphonic acid and/or sulfonic acid groups e.g. 2–30 such groups. Examples of such compounds used as inhibitors are aliphatic phosphonic acids with 2–50 carbons, such as hydroxyethyl diphosphonic acid, and aminoalkyl phosphonic acids, e.g. polyaminomethylene phosphonates with 2–10 N atoms e.g. each bearing at least one methylene phosphonic acid group; examples of the latter are ethylenediamine tetra(methylene phosphonate), diethylenetramine penta(methylene phosphonate) and the triamine- and tetramine-polymethylene phosphonates with 2–4 methylene groups between each N atom, at least 2 of the numbers of methylene groups in each phosphonate being different (e.g. as described further in published EP-A479462, the disclosure of which is herein incorporated by reference). Other exemplary scale inhibitors are polycarboxylic acids such as acrylic, maleic, lactic or tartaric acids, and polymeric anionic compounds such as polyvinyl sulphonic acid and polyacrylic acids, optionally with at least some phosphonyl or phosphinyl groups as in phosphinyl polyacrylates.

Table 1 below lists the most preferred scale inhibitors to be used in the first aqueous phase.

TABLE 1

| SYMBOL | CHEMICAL NAME |
|---|---|
| NTMP | Nitrilo tri(methylene phosphonic acid) |
| BHPMP | Bis-hexamethylene triamine-penta(methylene phosphonic) acid |
| PAA | Poly(acrylic) acid |
| DTPMP | Diethylene triamine-penta(methylene) phosphonic) acid |
| PPCA | Phosphinopolycarboxylic acid |
| SPA | Sulfonated polyacrylic acid |
| HEDP | 1-Hydroxyethylidene-1,1-diphosphonic acid |
| HDTMP | Hexamethylene diamine-tetra(methylene phosphonic) acid |

The amount of scale inhibitor used is preferably in the range from 1–50% w/w of the aqueous phase, more preferably from 5–30% w/w, and most preferably from 6–20% w/w. The amount of inhibitor used is dependent on the severity of the scaling tendency, production rate of water, and the desired squeeze life. The most preferred scale inhibitor is dependent upon conditions such as the scale mineral being inhibited, the water chemistry and temperature. For example, in the situation where calcite or calcium carbonate is to be prevented, a preferred inhibitor is nitrilo-tri(methylene phosphonate). If barium sulfonate is to be inhibited bis-hexamethylene triamine-penta(methylene phosphonate or a polymeric inhibitor may be preferred. Also, combinations of these scale inhibitors may also be used.

Solvent

The first aqueous phase may comprise a water miscible solvent such as methanol, ethanol, n-propanol, iso-propanol, n-butanol, iso-butanol, tert-butanol, butyl monoglycol ether, butyl diglycol ether, butyl triglycol ether, ethylene glycol mono butyl ether and ethylene glycol. The solvent can help break up surfactant structures that may make the system too viscous, speed equilibrium, and adjust the over all phase behavior. It is believed that the presence of a solvent of intermediate solubility in the aqueous phase and oil phase assists in making a stable emulsion. The most preferred solvent may be butanol, however the preferred type and amount is very dependent on the surfactant used, and the nature of the oil and brine.

The volume fraction of the solvent in the aqueous phase is generally in the range from 1–50%, more preferably 10 to 40%, and most preferably 20 to 30%. The same solvents as described above with respect to the first base emulsion are preferably used in the second aqueous phase as well.

B. Second Base Emulsion Including Retention Enhancing Chemical

The second base emulsion containing the retention enhancing chemical also preferably has an oil continuous phase which is immiscible with a second aqueous phase. The volume fraction of the aqueous phase in the second emulsion is ideally the same as in the first aqueous phase, i.e., in the range from 1–80%, preferably 10 to 50%, and more preferably from 30 to 45%. The same oils may be used as was discussed above with respect to the emulsion containing the first aqueous phase. Again, a surfactant is ideally used to enhance the emulsification of the second base emulsion. The surfactant is suitably present in the emulsion in an amount ranging from 0.5 to 20% by weight, more preferably from 1 to 15% by weight, and most preferably from 2 to 10% by weight.

Second Aqueous Phase Including Retention Enhancing Chemical

The retention enhancing chemical, in the case where a scale inhibitor is used in the first aqueous phase, is ideally a scale inhibitor precipitant. The retention enhancing agent includes Group II metals, Group III metals, and transition elements in an amount sufficient to react with the first treatment chemical. The retention enhancing agents may include metal hydroxide, metal oxide, metal alkoxide and mixtures thereof, and wherein the metal is selected from the group comprising lithium, sodium, potassium, magnesium, calcium, strontium, barium, boron or mixtures thereof. The retention enhancing agent may also be chemicals which produce a retention favoring pH when mixed with the inhibitor. Examples are simple mineral acids and bases, organic acids, urea, and sulfamic acid. Organic molecules may also be used as a retention enhancing chemical, particularly in the case of use with conformance chemicals. Condensable aldehydes are an example. More particularly, in the case of scale inhibitors, the most preferred retention enhancing chemical contains calcium ion.

The molar ratio of scale inhibitor retention enhancing chemical to the scale inhibitor is preferably between 0.5–20:1, more preferably from 10:1, and most preferably about 2.5:1. The overabundance of retention enhancing chemicals is especially valuable when the concentration of calcium or other retaining chemical in the existing formation is non existent or low.

The volume fraction of the solvent in the aqueous phase in the overall emulsion is generally in the range from 1–50%, more preferably 10 to 40%, and most preferably 20 to 30%. The same solvents as described above with respect to the first base emulsion are preferably used.

II. Introduction of the Emulsion into the Subterranean Formation

The emulsion is introduced into the formation using the following steps. Ideally, a pre-flush or spearhead is placed within the well bore and into the formation. Ideally, this pre-flush has a hydrocarbon base. Next the emulsion is delivered into the well bore and the formation to be treated. Next, a post flush having a hydrocarbon base is used to squeeze or push the emulsion into the formation. Ideally, an annular region of 4–12 feet around the well bore is treated with the emulsion. The well bore and formation are then shut-in for a period of 8–24 hours.

The oil continuous emulsion then ideally breaks or inverts from the oil continuous phase to the water continuous phase. This allows treatment chemical and retention enhancing chemical to react together causing the treatment chemical to be retained by the rock in the formation. For the purposes of this specification, the term "treatment chemical" which shall also include reactants derived from the original treatment chemicals which react with the retention enhancing chemical or agent which is then retained by the formation and is used for treatment purposes. The emulsion ideally warms in the reservoir and the emulsion phase behavior will shift becoming unstable. The aqueous droplets from first and second aqueous phases will begin to coalesce allowing the calcium and phoshonate to react and form a gel or precipitation phase which falls out of solution and is retained on the formation rock.

When the well is put back on production the oil phase and the aqueous phase, minus the calcium and inhibitors retained in the formation, are returned. Over the life of the squeeze, the inhibitor will be returned in the production water from the formation at a low rate, but at a concentration that is above the minimum concentration effective for preventing scale, for example at a rate of 2–10 ppm. The life of the squeeze is over when the return concentration of the inhibitor drops below the minimum effective concentration.

The present invention increases the efficiency of the scale inhibitor by:
1. extending the squeeze life;
2. effectively placing the inhibitor in contact with the formation rock by ideally forming an insoluble phase which precipitates or adsorbs out of the aqueous phase or is otherwise retained by the formation;
3. increasing the retention time or amount of time the inhibitor is effective by controlling the stoichiometry of the inhibitor to retention enhancing chemical reaction; and
4. decreasing the amount of unused, misplaced or returned inhibitor.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

The invention claimed is:

1. A method for retaining a treatment chemical in a subterranean formation containing hydrocarbons, the method comprising:
    (a) preparing an emulsion including:
        (i) an oil continuous phase;
        (ii) a first aqueous phase including a first treatment chemical which is to be retained in a subterranean formation; and
        (iii) a second aqueous phase including a second chemical which is to be reacted with the first treatment chemical in the subterranean formation to enhance retention of the treatment chemical in the subterranean formation;
        wherein the first and second aqueous phases remain generally separately dispersed and stable within the oil continuous phase;

(b) placing the emulsion down a well bore and into the subterranean formation; and (c) allowing the first and second aqueous phases to interact with one another in the subterranean formation such that the first treatment chemical and the second chemical react with one another resulting in the first treatment chemical securing to the subterranean formation.

2. The method of claim 1 wherein:
the oil continuous phase includes at least one surfactant which aids in the formation of the oil continuous emulsion.

3. The method of claim 2 wherein:
the surfactant includes one of an anionic surfactant and a non-ionic surfactant.

4. The method of claim 1 wherein:
the oil continuous phase and the first and second aqueous phases separate or invert within the subterranean formation to enhance the rate of reaction between the first and second aqueous phases.

5. The method of claim 4 wherein:
the subterranean formation contains fluids including hydrocarbons and water and the water in the subterranean formation assists in the inversion of the emulsion from an oil continuous phase to a water continuous phase.

6. The method of claim 4 wherein:
the emulsion receives heat from the subterranean formation which enhances the inversion of the emulsion from an oil continuous phase to a water continuous phase.

7. The method of claim 4 wherein:
the inversion of the emulsion from an oil continuous phase to a water continuous phase is enhanced by the presence of salt in the subterraneous formation which increases the salinity or ionic strength of the aqueous phase.

8. The method of claim 4 wherein:
the step of inverting the oil continuous phase and the first and second aqueous phases occurs as the emulsion warms.

9. The method of claim 8 wherein:
the second chemical is sulfamic acid.

10. The method of claim 1 wherein:
the first aqueous phase and the second aqueous phase are prepared as separate oil continuous emulsions prior to their being mixed together to form the oil continuous emulsions prior to their being mixed together to form the oil continuous emulsion which is placed down the well bore and into the subterranean formation.

11. The method of claim 1 wherein:
the first treatment chemical includes at least one of a scale inhibitor, a proppant, a polymer and a conformance controller.

12. The method of claim 1 wherein:
the first treatment chemical includes a scale inhibitor and the amount of active scale inhibitor is in the range of 0.5–35% wt./vol. of the first aqueous phase.

13. The method of claim 12 wherein:
the amount of active scale inhibitor is in the range of 5–15% wt./vol. of the first aqueous phase.

14. The method of claim 13 wherein:
the amount of active scale inhibitor is in the range of 5–10% wt./vol. of the first aqueous phase.

15. The method of claim 1 wherein:
the first treatment chemical comprises a scale inhibitor which includes at least one of Nitrilo tri(methylene phosphonic) acid Bis-hexamethylene triamine-penta (methylene phosphonic) acid, Poly(acrylic) acid, Diethylene triamine-penta(methylene phosphonic) acid, Phosphinopolycarboxylic acid, Sulfonated polyacrylic acid, 1-Hydroxytheylidene-1,1-diphosphonic acid, and
Hexamethylene diamine-tetra(methylene phosphonic) acid.

16. The method of claim 1 wherein:
the first treatment chemical comprises a scale inhibitor including a combination of at least two of Nitrilo tri(methylene phosphonic) acid, Bis-hexamethylene triamine-penta(methylene phosphonic) acid, Poly (acrylic) acid, Diethylene triamine-penta(methylene phosphonic) acid, Phosphinopolycarboxylic acid, Sulfonated polyacrylic acid, 1-Hydroxyethylidene-1,1-diphosphonic acid, and Hexamethylene diamine-tetra (methylene phosphonic) acid.

17. The method of claim 1 wherein:
the first aqueous phase includes a solvent.

18. The method of claim 1 wherein:
the second aqueous phase includes a solvent.

19. The method of claim 1 wherein:
the retention enhancing agent includes at least one ion of Group II metals, Group III metals, and transition elements in an amount sufficient to react with the first treatment chemical.

20. The method of claims 1 wherein:
the retention enhancing agent comprises one of metal hydroxide, metal oxide, metal alkoxide, and mixtures thereof, and wherein the metal is selected from the group comprising lithium, sodium, potassium, magnesium, calcium, strontium, barium, boron or mixtures thereof.

21. The method of claim 1 wherein:
the molar ratio of the retention enhancing agent to the first treatment chemical is in the range of 0.5–20:1.

22. The method of claim 21 wherein:
the molar ratio of the retention enhancing agent to the first treatment chemical is in the range of 0.1–10:1.

23. The method of claim 22 wherein:
the molar ratio of the retention enhancing agent to the first treatment chemical is in the range of 0.5–5:1.

24. A method for retaining a treatment chemical in a subterranean formation, the method comprising:
(a) preparing an emulsion including:
(i) an oil continuous phase includes-at least one surfactant, capable of forming an oil continuous phase emulsion;
(ii) a first aqueous phase including a first treatment chemical which is to be retained in a subterranean formation; and
(iii) a second aqueous phase including a second chemical which is to be reacted with the first chemical in the subterranean formation to enhance the retention of the first treatment chemical to the subterranean formation;
(b) placing the emulsion down a well bore and into the subterranean formation; and
(c) permitting the first and second chemicals in the aqueous phases to react for a sufficient period of time causing the first treatment chemical to be retained in the subterranean formation.

* * * * *